United States Patent
Park et al.

(10) Patent No.: US 9,935,317 B2
(45) Date of Patent: Apr. 3, 2018

(54) LITHIUM AIR BATTERY

(71) Applicant: SK Innovation Co., Ltd., Seoul (KR)

(72) Inventors: Myoung Gu Park, Daejeon (KR); Kyong Sik Kim, Daejeon (KR); Seong Ho Chun, Daejeon (KR); Hee Young Sun, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 100 days.

(21) Appl. No.: 14/450,679

(22) Filed: Aug. 4, 2014

(65) Prior Publication Data

US 2015/0037692 A1    Feb. 5, 2015

(30) Foreign Application Priority Data

Aug. 5, 2013  (KR) .................. 10-2013-0092538

(51) Int. Cl.
| | |
|---|---|
| *H01M 2/02* | (2006.01) |
| *H01M 4/86* | (2006.01) |
| *H01M 12/08* | (2006.01) |
| *H01M 4/38* | (2006.01) |

(52) U.S. Cl.
CPC ....... *H01M 4/8626* (2013.01); *H01M 2/0255* (2013.01); *H01M 4/8663* (2013.01); *H01M 12/08* (2013.01); *H01M 4/382* (2013.01); *H01M 2300/0082* (2013.01); *Y02E 60/128* (2013.01)

(58) Field of Classification Search
CPC .......... H01M 2/02; H01M 4/86; H01M 12/08; H01M 4/38
See application file for complete search history.

(56) References Cited

U.S. PATENT DOCUMENTS

| | | | | |
|---|---|---|---|---|
| 7,282,295 B2 * | 10/2007 | Visco | .................. | H01M 2/1673 29/623.1 |
| 8,835,046 B2 * | 9/2014 | Liu | ........................ | H01M 4/366 29/592 |
| 2010/0216026 A1 * | 8/2010 | Lopatin | .................... | C25D 1/00 429/246 |
| 2012/0028164 A1 | 2/2012 | Lee et al. | | |
| 2012/0171594 A1 * | 7/2012 | Mizuno | ............... | H01M 4/8652 429/480 |
| 2012/0264025 A1 * | 10/2012 | Suto | ........................ | H01M 6/04 429/405 |
| 2012/0282527 A1 * | 11/2012 | Amine | .................. | H01M 4/366 429/231.8 |
| 2014/0186686 A1 * | 7/2014 | Takahashi | ............... | H01M 2/38 429/163 |

* cited by examiner

*Primary Examiner* — Jonathan Crepeau
*Assistant Examiner* — Angela Martin
(74) *Attorney, Agent, or Firm* — The Webb Law Firm

(57) ABSTRACT

Provided is a lithium air battery, and more particular, a lithium air battery including a buffer layer consisting of a conductive ion-exchange resin and a mesoporous carbon formed between an electrolyte and a catalyst layer configuring a cathode to prevent a contact between the catalyst layer and a large amount of electrolyte in the lithium air battery, thereby reducing occurrence of overvoltage at the time of charging and discharging the battery. At the same time, the lithium air battery of the present invention may suppress evaporation of the electrolyte solution to improve durability, thereby preventing deterioration in performance of the battery, and extending a lifespan.

16 Claims, 9 Drawing Sheets

LITHIUM AIR BATTERY

CROSS-REFERENCE TO RELATED APPLICATION

This application claims priority to Korean Patent Application No. 10-2013-0092538 filed Aug. 5, 2013, the disclosure of which is hereby incorporated in its entirety by reference.

TECHNICAL FIELD

The following disclosure relates to a lithium air battery, and more particular, to a lithium air battery capable of preventing deterioration in performance of the battery and extending a lifespan by stabilizing a contact between a catalyst layer and an electrolyte at the time of charging and discharging the battery.

BACKGROUND

Recently, in accordance with an increase in carbon dioxide emission due to consumption of fossil fuel, a rapid change of crude oil price, and the like, development of a technology of converting from gasoline and diesel oil to an electric energy as an energy source of automobile has been spotlighted. Commercialization of an electric automobile has progressed, and for a long-distance driving, a lithium ion battery which is a storage battery has been required to have large capacity and high energy densification. However, the current lithium ion battery has a limitation in battery capacity, which has difficulty in a long distance driving. Therefore, research into a lithium air battery having larger capacity and higher energy density than those of a theoretical lithium ion battery has been actively conducted.

In general, the lithium air battery includes an anode capable of adsorbing and emitting lithium ions, a cathode including an oxidation-reduction catalyst using oxygen in the air as a cathode active material, wherein a lithium ion conductive medium is provided between the cathode and the anode. That is, the lithium air battery, which is a battery having the cathode using oxygen in the air as the active material, is a battery capable of charging and discharging the battery by performing an oxidation-reduction reaction of oxygen in the cathode.

The lithium air battery has a theoretical energy density of 3000 Wh/kg or more, which corresponds to an energy density about 10 times larger than that of the lithium ion battery. In addition, the lithium ion battery is environmentally friendly and provides improved stability as compared to the lithium ion battery.

However, an electrode structure of the existing lithium air battery has problems in that at the time of charging and discharging the battery, a large amount of an electrolyte contacts a catalyst layer to generate overvoltage, or a solvent of an electrolyte used between the solid electrolyte and a porous air-cathode is evaporated, such that the lithium air battery has deteriorated performance and reduced a lifespan.

As the related art document regarding the above-description, U.S. Patent Application Publication No. 2012/0028164 A1 entitled "lithium air battery" is disclosed.

RELATED ART DOCUMENT (Patent Document 1) U.S. Patent Application Publication No. 2012/0028164 A1 (Feb. 2, 2012)

SUMMARY

An embodiment of the present invention is directed to providing a lithium air battery capable of preventing deterioration in performance of the battery and extending a lifespan by preventing a contact between a catalyst layer configuring a cathode of the lithium ion battery and a large amount of electrolyte to reduce occurrence of overvoltage at the time of charging and discharging the battery and suppress evaporation of the electrolyte solution, thereby improving durability.

In one general aspect, a lithium air battery includes: a first electrode part including a lithium metal; a second electrode part including a gas diffusion layer of which one side contacts an air, a catalyst layer formed on the other side of the gas diffusion layer, a membrane coupled to the catalyst layer so that lithium ions pass therethrough, and a buffer layer provided between the membrane and the catalyst layer, and spaced apart from the first electrode part; and an electrolyte part provided between the first electrode part and the second electrode part.

The buffer layer may contain a mesoporous carbon impregnated with a conductive ion-exchange resin solution.

The conductive ion-exchange resin solution may contain at least 20 wt % (in $H_2O$) of a conductive ion-exchange resin.

The conductive ion-exchange resin may be a mixture containing one or two selected from the group consisting of nafion, diaion, and trilite.

The electrolyte part may include a separator closely adhered on one side of the first electrode part and containing an organic-based electrolyte, a solid electrolyte closely adhered on one side of the separator, and a water-based electrolyte, a non-water-based electrolyte, or an ionic liquid electrolyte provided between the solid electrolyte and the second electrode part.

The solid electrolyte may be a proton conductive ion-exchange resin or a proton conductive ion-exchange film, specifically, a Nafion film.

The second electrode part may further include a polyolefin-based microporous film coupled on one side of the gas diffusion layer.

The lithium air battery may further include: a housing part including a first housing provided with a space part having an open upper side, and a second housing disposed at an upper portion of the first housing to seal the space part of the first housing, and having an air accommodation part having an open lower side, and ventilation holes formed therein to communicate with the air accommodation part, wherein the first electrode part is accommodated into the space part of the first housing, the second electrode part is coupled to the lower side of the air accommodation part of the second housing to be spaced apart from the first electrode part and has the gas diffusion layer disposed on an upper side thereof and the membrane disposed on a lower side thereof, and the electrolyte part is provided in the space part of the first housing to be provided between the first electrode part and the second electrode part.

The electrolyte part may include a separator closely adhered on an upper side of the first electrode part and containing an organic-based electrolyte, a solid electrolyte closely adhered on an upper side of the separator, a water-based electrolyte, a non-water-based electrolyte, or an ionic liquid electrolyte provided between the solid electrolyte and the second electrode part, and an accommodation body provided on an upper side of the solid electrolyte and having an accommodation hole vertically penetrating therethrough, and the accommodation body may be disposed so that the solid electrolyte, the separator, and the first electrode part are closely adhered to the space part.

The housing part may further include a third housing interposed between the first housing and the second housing and having a fixing hole vertically penetrating therethrough so that the second electrode part is fixed to the fixing hole.

The membrane may be a porous membrane containing a sulfonic acid group.

The membrane may be made of a polyperfluorosulfonic acid (PFSA) resin having a porous material.

The membrane may be closely adhered to the catalyst layer by heating and pressing the PFSA resin or by a dip-coating method using a PFSA resin solution.

[Detailed Description of Main Elements]

Figure 1:
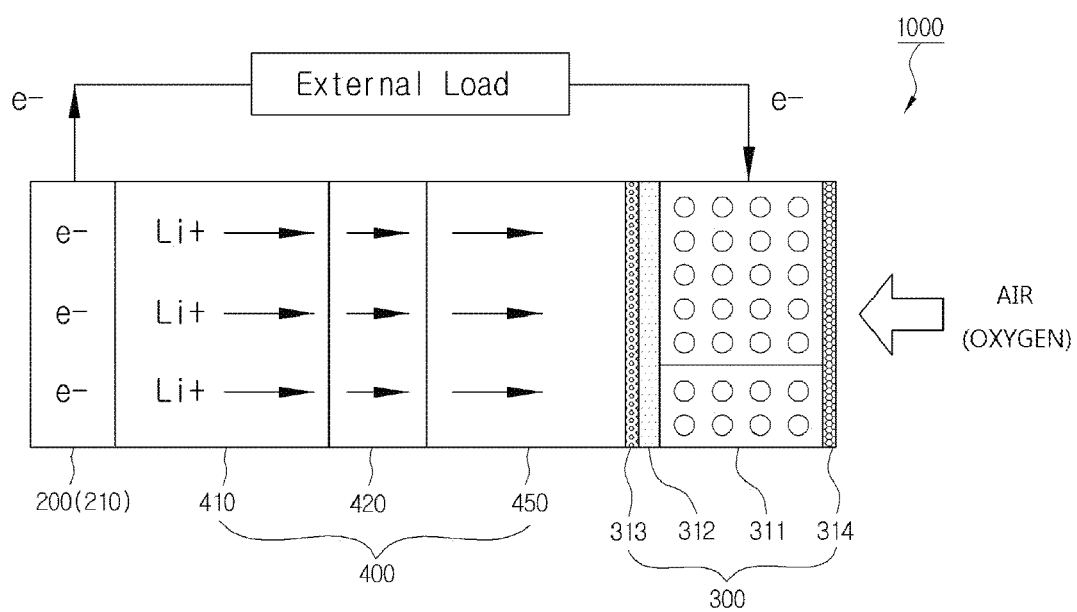
FIG. 1 is a conceptual diagram showing a lithium air battery of the present invention.

1000: Lithium Air Battery
100: Housing Part
110: First Housing
111: Space Part
112: Coupling Hole
120: Second Housing
121: Ventilation Hole
122: Air Accommodation Part
127: First Fixing Part
128: First Coupling Part
130: Third Housing

[Detailed Description of Main Elements]

131: Fixing Hole
132: Second Fixing Part
133: Second Coupling Part
134: Through-Hole
200: First Electrode Part
210: Lithium Metal
220: Current Collector
300: Second Electrode Part
311: Gas Diffusion Layer
312: Catalyst Layer
313: Membrane
314: Polyolefin-based microporous film
315: Buffer Layer
400: Electrolyte Part
410: Separator (Organic-based Electrolyte)
420: Solid Electrolyte
430: Accommodation Body
431: Accommodation Hole
440: First Sealing Part
450: Water-based Electrolyte

DETAILED DESCRIPTION OF EMBODIMENTS

Hereinafter, a lithium air battery according to the present invention is described in detail with reference to the accompanying drawings. The drawings to be described below are provided by way of example so that the idea of the present invention can be sufficiently transferred to those skilled in the art to which the present invention pertains. Therefore, the present invention may be implemented in many different forms, without being limited to the drawings to be described below. The drawings may be exaggerated in order to specify the spirit of the present invention. Further, like reference numerals denote like components throughout the specification.

Here, unless technical and scientific terms used herein are defined otherwise, they have meanings understood by those skilled in the art to which the present invention pertains. Known functions and components which obscure the description and the accompanying drawings of the present invention with unnecessary detail will be omitted.

Figure 2:
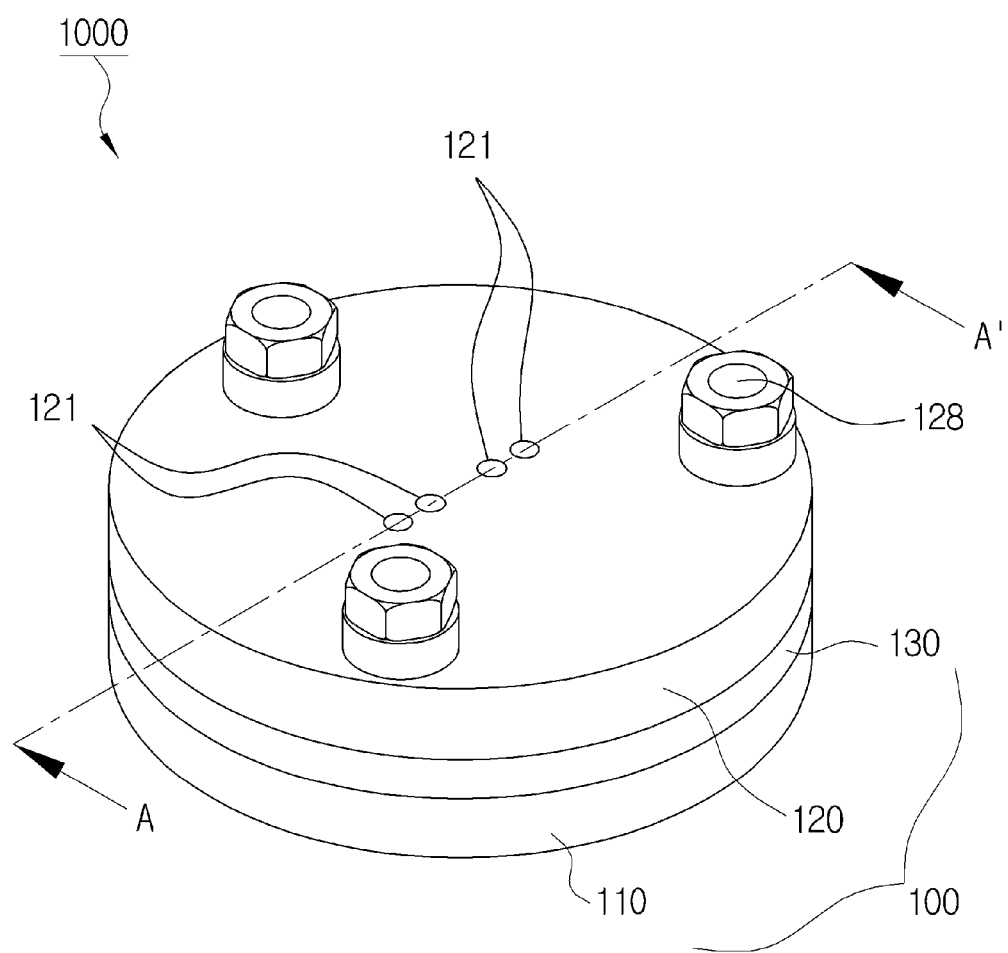
FIGS. 2 and 3 are an assembled perspective view and an exploded perspective view of a lithium air battery according to an exemplary embodiment of the present invention, respectively.
Figure 3:
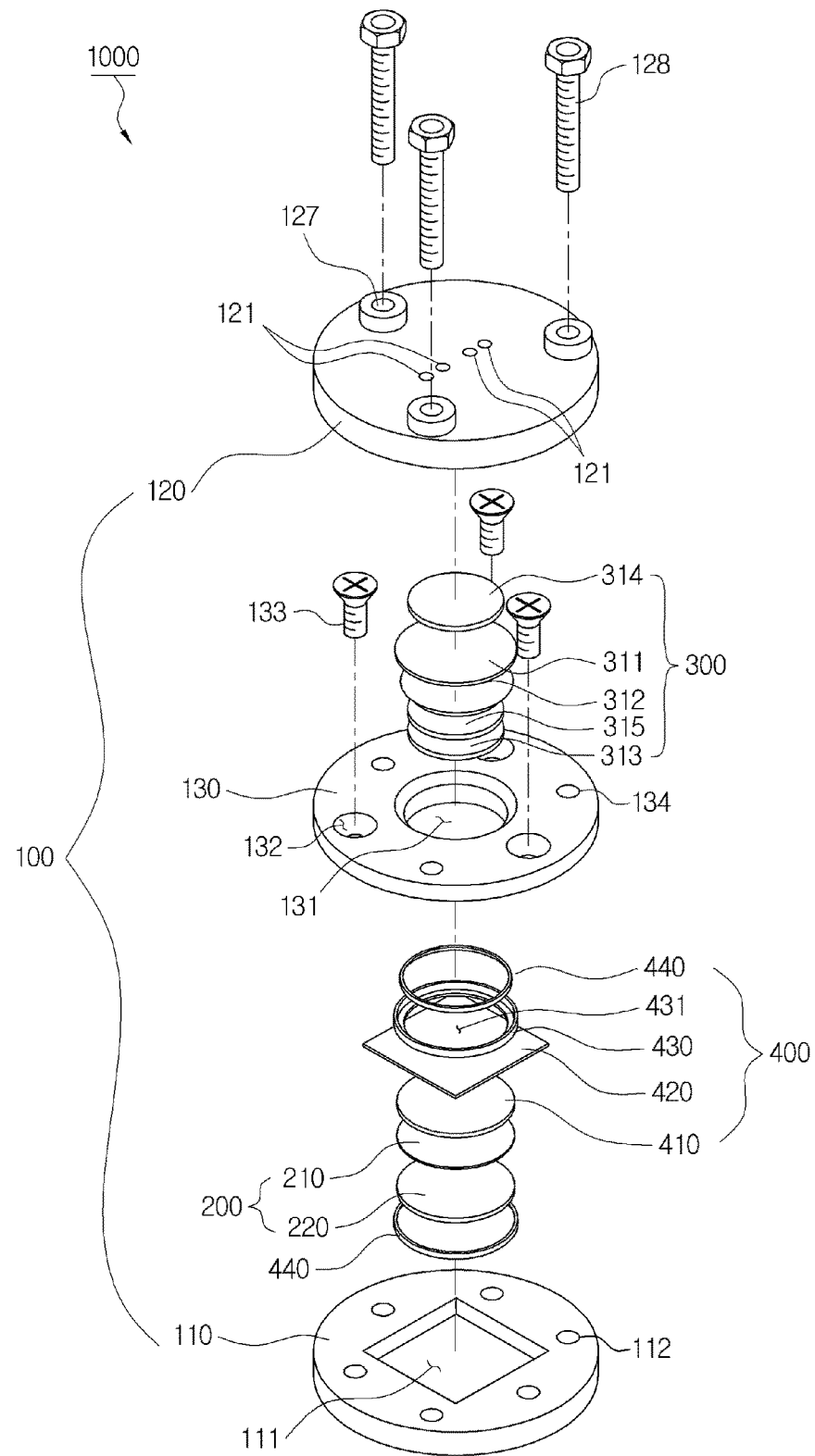
Figure 4:
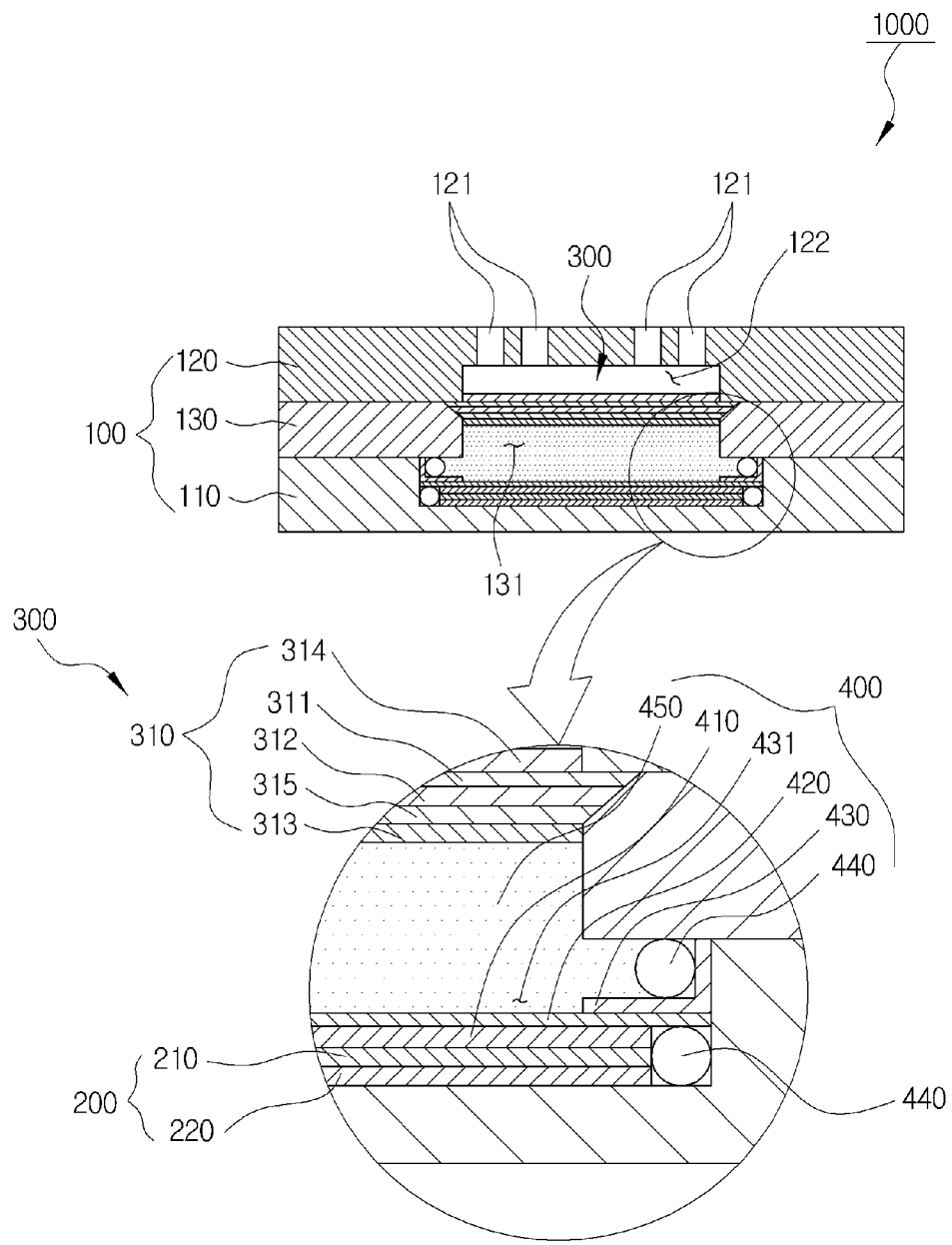
FIG. 4 is a cross sectional view taken along line AA' of FIG. 2.
Figure 5:
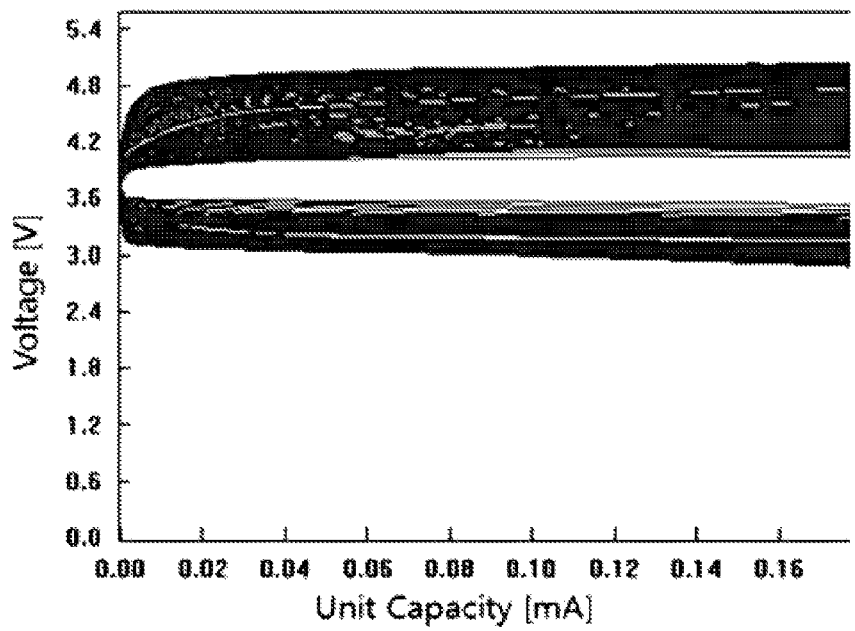
FIG. 5 is a graph showing a charge and discharge cycle (cycle life: 246 cycles) of the lithium air battery according to the exemplary embodiment of the present invention.
Figure 6:
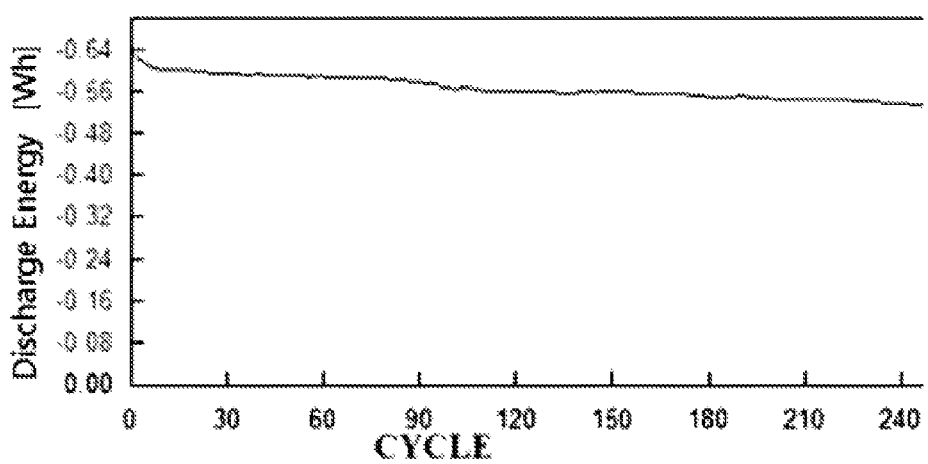
FIG. 6 is a graph showing a discharge energy of the lithium air battery according to the exemplary embodiment of the present invention.
Figure 7:
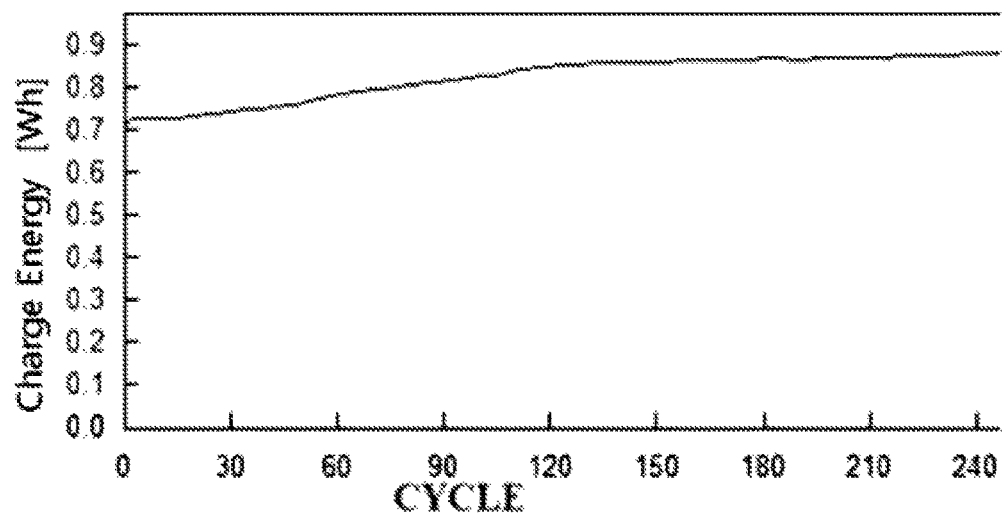
FIG. 7 is a graph showing a charge energy of the lithium air battery according to the exemplary embodiment of the present invention.
Figure 8:
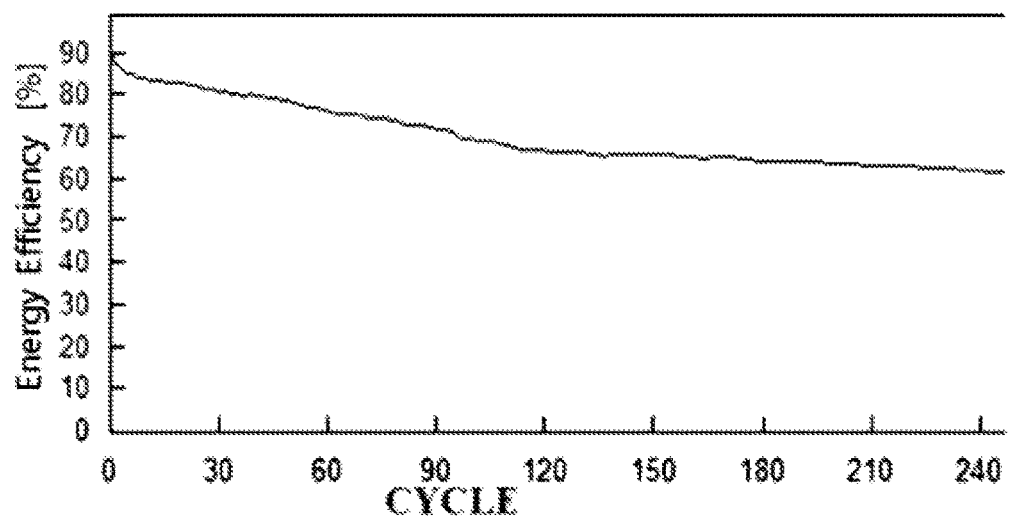
FIG. 8 is a graph showing a charge and discharge energy efficiency of the lithium air battery according to the exemplary embodiment of the present invention.
Figure 9:
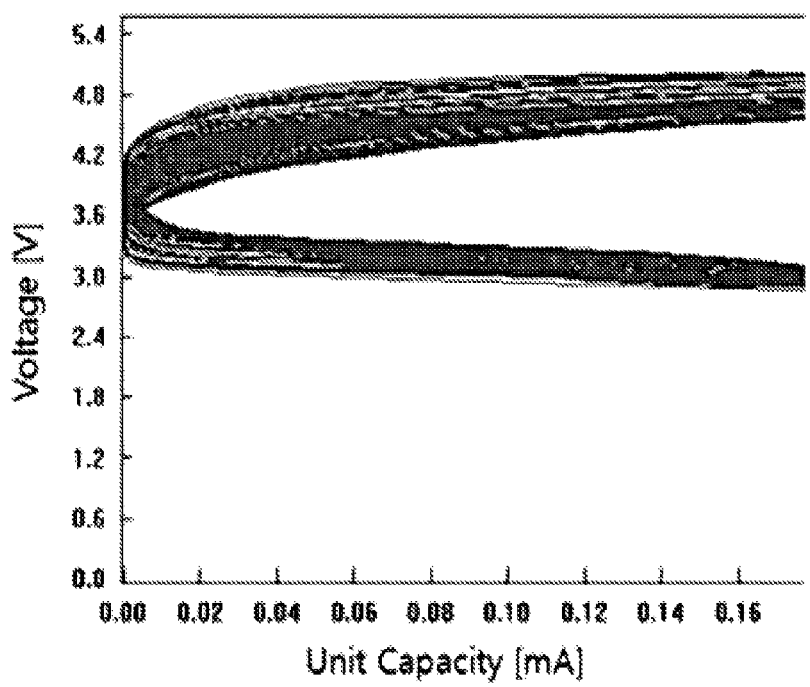
FIG. 9 is a graph showing a charge and discharge cycle (cycle life: 123 cycles) of a lithium air battery according to Comparative Example 1, having a cathode including a microporous film, a gas diffusion layer, a catalyst layer, and a membrane applied thereto.
Figure 10:
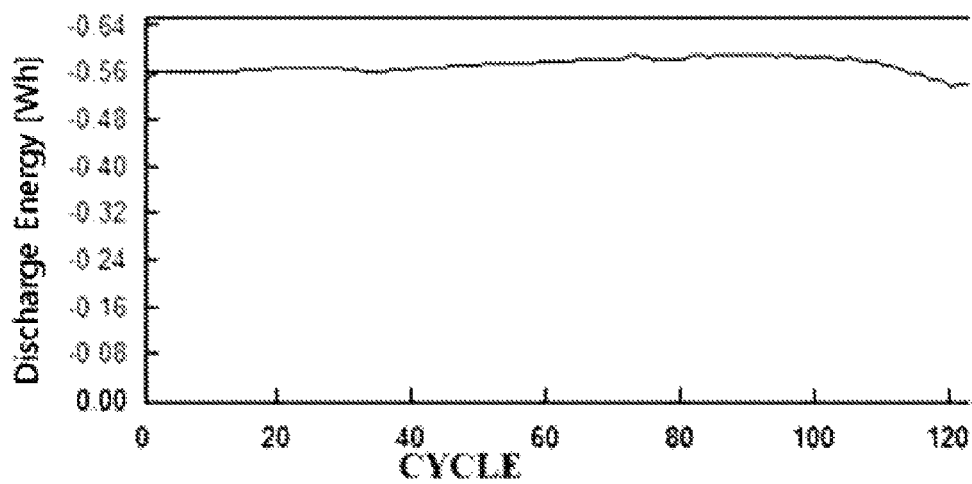
FIG. 10 is a graph showing a discharge energy of a lithium air battery according to Comparative Example 1.
Figure 11:
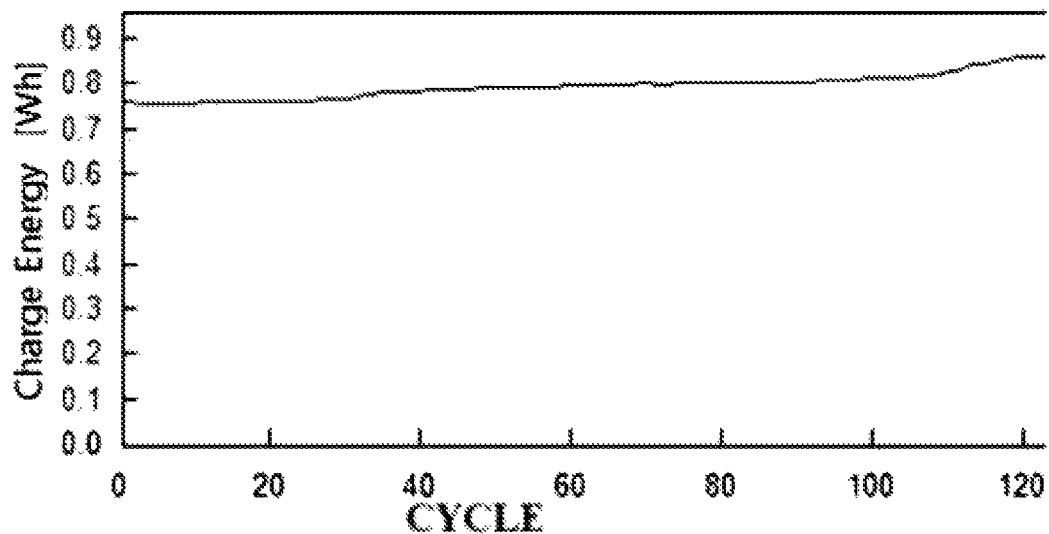
FIG. 11 is a graph showing a charge energy of the lithium air battery according to Comparative Example 1.
Figure 12:
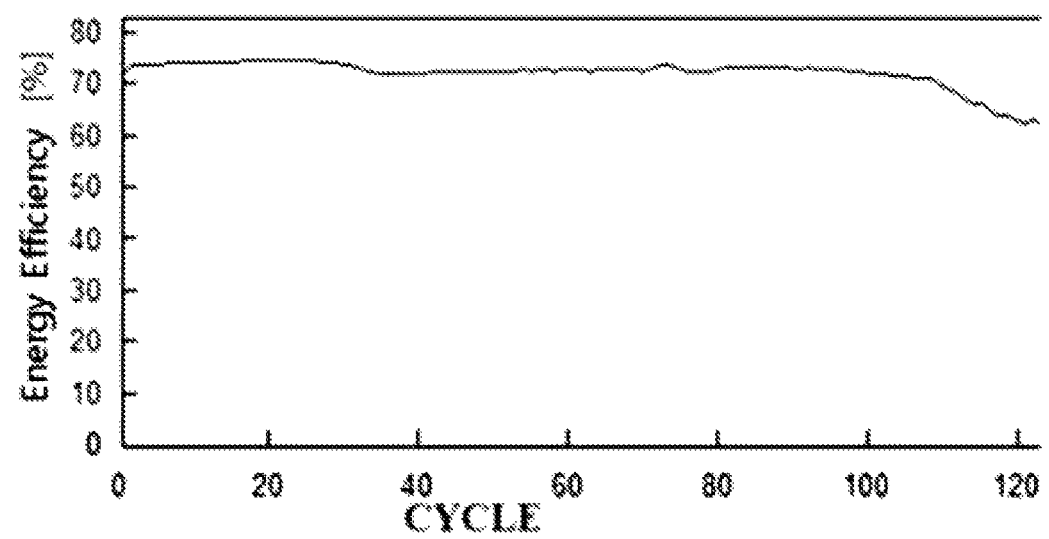
FIG. 12 is a graph showing a charge and discharge energy efficiency of the lithium air battery according to Comparative Example 1.
Figure 13:
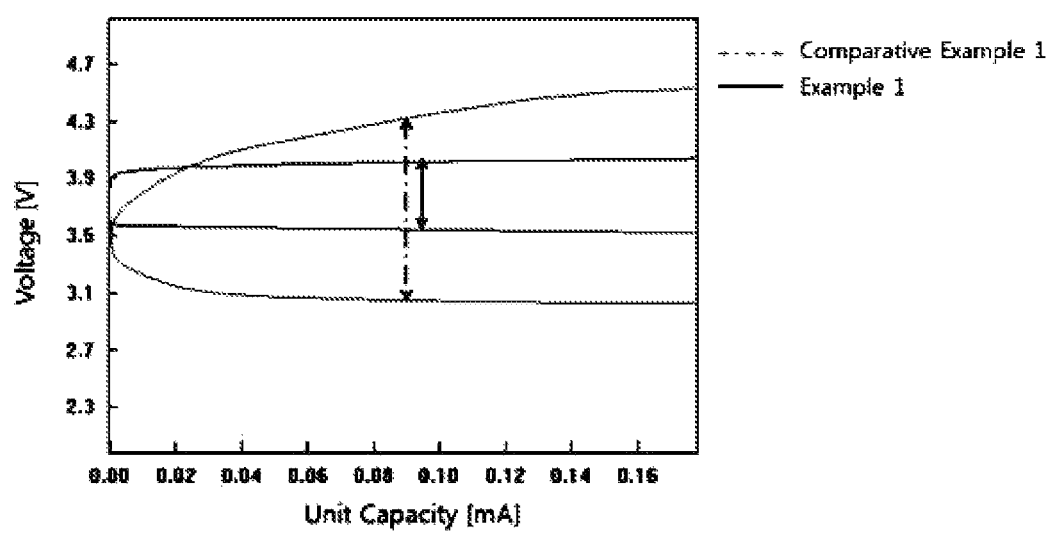
FIG. 13 is a graph showing relative comparison of overpotential degree shown in the first cycle between the exemplary embodiment of the present invention and Comparative Example 1.

FIG. 1 is a conceptual diagram showing a lithium air battery of the present invention, and FIGS. 2 to 4 are an assembled perspective view, an exploded perspective view, and a cross sectional view of a lithium air battery according to an exemplary embodiment of the present invention, respectively.

As shown in the drawings, the lithium air battery 1000 according to the present invention includes: a first electrode part 200 including a lithium metal 210; a second electrode part 300 including a gas diffusion layer 311 of which one side contacts an air, a catalyst layer 312 formed on the other side of the air diffusion layer 311, a membrane 313 coupled to the catalyst layer 312 so that lithium ions pass through the membrane, and a buffer layer 315 provided between the membrane 313 and the catalyst layer 312, and spaced apart from the first electrode part 200; and an electrolyte part 400 provided between the first electrode part 200 and the second electrode part 300.

First, the lithium air battery 1000 of the present invention largely consists of the first electrode part 200, the second electrode part 300, and the electrolyte part 400.

The first electrode part 200 may include the lithium metal 210 capable of storing and discharging the lithium ions, and may further include a binder. Examples of the lithium metal 210 may include a lithium metal, a lithium metal-based alloy, a lithium intercalating compound, and the like, and among them, the lithium alloy is preferred in order to improve durability with respect to moisture, and the like. Examples of the binder may include polyvinylidene fluoride (PVdF), polytetrafluoroethylene (PTFE), and the like, and a content of the binder is not specifically limited, but, for example, may be 30 wt % or less, and more specifically, 1 to 10 wt %.

The second electrode part 300 includes the gas diffusion layer (GDL) 311 of which one side contacts an air, the catalyst layer 312, the membrane 313, and the buffer layer 315, and is spaced apart from the first electrode part 200. Here, as shown in FIG. 1, in the second electrode part 300, the membrane 313 is disposed on a surface facing the first electrode part 200, the catalyst layer 312 is formed on one side of the gas diffusion layer 311, the membrane 313 is coupled to one side of the catalyst layer 312, and the buffer layer 315 is provided between the catalyst layer 312 and the membrane 313, thereby forming the second electrode part 300.

Thus, air is diffused through the gas diffusion layer 311, such that an oxidation-reduction reaction between lithium ions and oxygen in the air is generated in the catalyst layer 312. In addition, the electrolyte part 400 is provided between the first electrode part 200 and the second electrode part 300, such that the lithium ions are movable.

That is, the first electrode part 200 containing the lithium metal 210 becomes an anode, and the second electrode part 300 becomes a cathode, and the electrolyte part 400 is provided between the first electrode part 200 and the second electrode part 300, thereby configuring the lithium air battery 1000.

Here, the second electrode part 300 may use oxygen in the air as an active material and may contain conductive materials having pores through which oxygen and lithium ions pass, and the catalyst layer 312 may be formed by mixing platinum (Pt) and a binder, then applying or coating the mixture. That is, the catalyst layer 312 may be formed by mixing the catalyst, the conductive material, and the binder, then performing a press-molding process on the gas diffusion layer (or carbon paper) 311, or by mixing the catalyst, the conductive material, and the binder, then dissolving or dispersing the mixture into organic solvents such as acetone, methylethylketone, N-methyl-2-pyrrolidone, and the like, to thereby prepare a slurry, applying the prepared slurry on the gas diffusion layer 311 by gravure coating, blade coating, comma coating, dip coating methods and dispensing the organic solvent, followed by pressing.

In addition, as the conductive material, carbon materials, conductive fibers such as metal fiber, and the like, metal powder such as copper, silver, nickel, aluminum, and the like, organic conductive materials such as polyphenylene derivatives, and the like, may be used. As the carbon material, carbon black, graphite, activated carbon, carbon nanotube, carbon fiber, and the like, may be used, and mesoporous carbon obtained by firing a synthetic resin containing an aromatic ring compound, petroleum pitch, and the like, may be used.

The membrane 313 is coupled to one side of the catalyst layer 312 formed as described above. The membrane 313 is coupled to one side of the catalyst layer 312 to prevent particles of the catalyst layer 312 from being separated. Here, the membrane 313 is made of materials passing through the lithium ions and filtering the particles of the catalyst layer 312.

Specifically, in the lithium air battery 1000, at the time of charging and discharging the battery, air is diffused through the gas diffusion layer 311 of the second electrode part 300, such that the oxidation-reduction reaction between oxygen in the air and the lithium ions is generated in the catalyst layer 312, wherein when the charging and discharging of the battery is repeated for many times, crack may occur in the catalyst layer 312, such that particles (platinum, binder, and conductive materials) forming the catalyst layer 312 may be separated from the gas diffusion layer 311 toward the electrolyte part 400. Therefore, as described above, the particles of the catalyst layer 312 are prevented from being separated by coupling the membrane 313 to the catalyst layer 312.

The above-described membrane 313 may be made of a porous membrane containing a sulfonic acid group, more preferably, may be made of a polyperfluorosulfonic acid (PFSA) (Product Name: Nafion) resin having a porous material. In addition, the membrane 313 may be closely adhered to the catalyst layer 312 by performing a heating process and a pressing process. Further, the membrane 313 may be formed by a dip-coating method using a PFSA; Nafion resin solution. The membrane 313 made of PFSA; Nafion has a proton ($H^+$, hydrogen ion)-conductivity (0.1 S/cm) and consists of a hydrophilic sulfonyl group and hydrophobic fluorinated backbones in view of a molecular structure. Therefore, the membrane has a hydrophilic property and the proton-conductivity property to pass through Li+ ions and absorb water required for a reaction with oxygen and water, thereby making action of lithium-air smooth, which is appropriate for protection of a platinum (Pt) catalyst layer 312 according to an object of the present invention.

That is, the membrane 313 may be made of a material in which particles of the catalyst layer 312 are capable of being prevented from being separated, and lithium ions are movable, which is the most preferred in view of performance of the lithium air battery.

In addition, the membrane 313 may be closely adhered to the catalyst layer 312 by performing a heating process and a pressing process. That is, the membrane 313 is heated and pressed by a high temperature on the catalyst layer 312, such that coupling strength between the catalyst layer 312 and the membrane 313 may be improved, thereby more definitely blocking separation of the particles of the catalyst layer 312 due to the repetition of the charging and discharging of the battery.

However, even though the particles of the catalyst layer 312 are prevented from being separated by coupling the membrane 313 to the catalyst layer 312, there are still problems in that at the time of charging and discharging the lithium air battery 1000, the contact degree between the catalyst layer 312 and the electrolyte is not adjusted but a large amount of electrolyte contacts the catalyst layer 312 to generate overvoltage, thereby functioning as a reason that a lifespan of the battery is deteriorated.

Accordingly, the lithium air battery 1000 of the present invention adopts the buffer layer 315 between the catalyst layer 312 and the membrane 313 in order to prevent the contact between the catalyst layer 312 and the large amount of electrolyte, thereby reducing occurrence of overvoltage at the time of charging and discharging the battery, such that deterioration in performance of the battery may be prevented and a lifespan thereof may be extended.

Here, the buffer layer 315, which consists of a conductive ion-exchange resin and mesoporous carbon, specifically, the mesoporous carbon may be a mesoporous carbon impregnated with a conductive ion-exchange resin solution. Here, it is characterized in that the conductive ion-exchange resin solution for impregnating the mesoporous carbon contains at least 20 wt % (in $H_2O$) of a conductive ion-exchange resin. The reason is because when the content of the conductive ion-exchange resin contained in the conductive ion-exchange resin solution is less than 20 wt % (in $H_2O$), since the content thereof is not sufficient, the lithium ions are not smoothly delivered from the electrolyte part 400 to the catalyst layer 312. Specifically, it is preferred that 20 to 50 wt % (in $H_2O$) of the conductive ion-exchange resin is contained in the conductive ion-exchange resin solution of the lithium air battery according to the exemplary embodiment of the present invention. Here, the exemplary embodiment of the present invention may be practiced even in the case in which the content of the ion-exchange resin of the conductive ion-exchange resin solution is more than 50 wt % (in $H_2O$); however, in this case, since the content is excessive, spreadability of the conductive ion-exchange resin solution may be deteriorated, such that it may not be easy to practice the exemplary embodiment of the present invention using the excessive content of the conductive ion-exchange resin.

The above-configured buffer layer 315 may be formed by applying all kinds of water-based electrolyte, non-water-based electrolyte, or ionic liquid electrolyte in the lithium air battery without differentiation.

Here, the conductive ion-exchange resin according to the exemplary embodiment of the present invention may be a mixture containing one or two selected from the group consisting of Nafion, Diaion, and Trilite. More specifically, the Nafion solution may be preferred as the conductive ion-exchange resin according to the present invention, which is because Nafion is thermally stable and contains proton and lithium ions having high conductivity.

In addition, the electrolyte part 400 may include a separator 410 closely adhered on one side of the first electrode part 200 and containing an organic-based electrolyte, a solid electrolyte 420 closely adhered on one side of the separator 410, and a water-based electrolyte, a non-water-based electrolyte, or an ionic liquid electrolyte 450 provided between the solid electrolyte 420 and the second electrode part 300.

Herein, the organic-based electrolyte, the solid electrolyte 420, and the water-based electrolyte, the non-water-based electrolyte, or the ionic liquid electrolyte 450 will be described in more detail in the following lithium air battery 1000 according to the exemplary embodiment of the present invention.

In addition, the second electrode part 300 further includes a polyolefin-based microporous film 314 coupled on one side of the gas diffusion layer 311. That is, the polyolefin-based microporous film 314 is coupled on one side of the gas diffusion layer 311 to thereby suppress the water-based electrolyte, the non-water-based electrolyte, or the ionic liquid electrolyte 450 solvent from being evaporated, such that even though the charging and discharging of the lithium air battery is repeated, deterioration in performance of the lithium air battery 1000 may be prevented and a lifespan thereof may be extended.

In addition, the lithium air battery 1000 according to the exemplary embodiment of the present invention includes a housing part 100 including a first housing 110 provided with a space part 111 having an open upper side, and a second housing 120 disposed at an upper portion of the first housing 110 to seal the space part 111 of the first housing 110, and having an air accommodation part 122 having an open lower side, and ventilation holes 121 formed therein to communicate with the air accommodation part 122, the first electrode part 200 including the lithium metal 210 accommodated into the space part 111 of the first housing 110; the second electrode part 300 coupled to the lower side of the air accommodation part 122 of the second housing 120 to be spaced apart from the first electrode part 200, and having the gas diffusion layer 311 disposed on an upper side thereof, the catalyst layer 312 disposed on a lower side of the gas diffusion layer 311, and the membrane 313 disposed on a lower side of the catalyst layer 312 to allow lithium ions to pass therethrough; and the electrolyte part 400 provided in the space part 111 of the first housing 110 and provided between the first electrode part 200 and the second electrode part 300.

That is, as shown in FIGS. 2 to 4, the lithium air battery 1000 according to the exemplary embodiment of the present invention largely includes the first electrode part 200, the second electrode part 300, and the electrolyte part 400 in the housing part 100.

The housing part 100 includes the first housing 110 and the second housing 120. The first housing 110 has a disc shape and includes the space part 111 formed therein, wherein the space part 111 is formed so that an upper side thereof is open. In addition, the second housing 120 also has a disc shape and is disposed at an upper portion of the first housing 110 to seal the space part 111 of the first housing 110. Here, the second housing 120 includes the air accommodating part 122 formed on a lower side thereof and includes the ventilation holes 121 so as to communicate with the air accommodating part 122, such that external air may flow into the air accommodation part 122 and may flow out to the air accommodation part 122, through the ventilation holes 121. The number of ventilation holes 121 may be one or plural, wherein the ventilation hole 121 may have various shapes so that air flows into the air accommodation part 122 and flows out to the air accommodation part 122.

In addition, the second housing 120 has first fixing parts 127 formed on one side thereof to be coupled to the first housing 110, wherein first coupling parts 128 are inserted into the first fixing parts 127, such that the first housing 110 may be coupled to the second housing 120. The first fixing part 127 of the second housing 120 according to the exemplary embodiment of the present invention is formed of a through-hole, the first coupling part 128 is formed of a bolt, the first housing 110 includes a coupling hole 112 as a female screw formed at a position corresponding to the first fixing part 127, such that the first coupling part 128 is coupled to the coupling hole 112 by penetrating through the first fixing part 127, whereby the first housing 110 and the second housing 120 may be coupled to each other. Here, the first housing 110 and the second housing 120 may be coupled in various schemes such as fit, welding, riveting, and the like, in addition to screw connection.

The first electrode part 200 includes the lithium metal 210, and the lithium metal 210 is accommodated into the space part 111 of the first housing 110.

The second electrode part 300 is coupled to seal the open lower side of the air accommodation part 122 of the second housing 120, and includes the gas diffusion layer 311 positioned at an upper side thereof and the catalyst layer 312 positioned at a lower side thereof, wherein the lower side of the catalyst layer 312 may be coupled to the membrane 313. Therefore, air accommodated into the air accommodation part 122 is diffused through the gas diffusion layer 311, such that an oxidation-reduction reaction between lithium ions and oxygen in the air may be generated in the catalyst layer 312.

The electrolyte part 400 may be provided in the space part 111 of the first housing 110, and may be disposed at the upper portion of the first electrode part 200. That is, the electrolyte part 400 is provided between the first electrode part 200 and the second electrode part 300, such that the lithium ions are movable.

That is, the first electrode part 200 including the lithium metal 210 becomes an anode, the second electrode part 300 becomes a cathode, and the electrolyte part 400 is provided between the first electrode part 200 and the second electrode part 300, thereby configuring the lithium air battery 1000.

Therefore, in the lithium air battery 1000 according to the exemplary embodiment of the present invention as configured above, even though the charging and discharging of the battery is repeated, the membrane 313 coupled to the lower side of the catalyst layer 312 of the second electrode part 300 may prevent the particles of the catalyst layer 312 from being separated toward the electrolyte part 400.

In addition, the lithium air battery 1000 according to the exemplary embodiment of the present invention adopts the buffer layer 315 between the catalyst layer 312 and the membrane 313 in order to prevent the contact between the catalyst layer 312 and the large amount of electrolyte, thereby preventing the contact between the catalyst layer 312 and the large amount of the electrolyte of the lithium air battery 1000, such that at the time of charging and discharging the battery, the occurrence of the overvoltage may be reduced.

Here, the electrolyte part 400 may include a separator 410 closely adhered on an upper side of the first electrode part 200 and containing the organic-based electrolyte, a solid electrolyte 420 closely adhered on an upper side of the separator 410, and a water-based electrolyte, a non-water-based electrolyte, or an ionic liquid electrolyte 450 provided between the solid electrolyte 420 and the second electrode part 300. Therefore, electrochemical properties and charge and discharge performance of the lithium air battery 1000 may be improved.

In addition, the second electrode part 300 may further include the polyolefin-based microporous film 314 coupled to the upper side of the gas diffusion layer 311, wherein the polyolefin-based microporous film 314 may prevent a solvent of the water-based electrolyte, the non-water-based electrolyte, or the ionic liquid electrolyte 450 from being evaporated. In particular, since the polyolefin-based microporous film 314 has extremely small size (about 10 nm) of pores and a hydrophobic property, when the water-based electrolyte is used as the electrolyte of the lithium air battery 1000, evaporation of moisture which is the solvent of the electrolyte 450 may be effectively suppressed.

Further, the electrolyte part 400 further includes a accommodation body 430 provided on an upper side of the solid electrolyte 420 and having a accommodation hole 431 vertically penetrating through the accommodation body, and the accommodation body may be configured so that the solid electrolyte 420, the separator 410, and the first electrode part 200 are closely adhered to the space part 111.

That is, as shown in FIG. 4, an upper edge part of the accommodation body 430 is pressed down by the second housing 120, and the solid electrolyte 420, the separator 410, and the first electrode part 200 may be closely adhered and fixed onto bottom surface of the space part 111 by the accommodation body 430. Here, the accommodation body 430 has the accommodation hole 431 formed in the center portion thereof so as to vertically penetrate through the accommodation body, such that the water-based electrolyte, the non-water-based electrolyte, or the ionic liquid electrolyte 450 contacts the solid electrolyte 420 through the accommodation hole 431, whereby lithium ions may be movable.

Therefore, the lithium air battery 1000 according to the exemplary embodiment of the present invention has decreased contact resistance among the electrolyte part 400, the first electrode part 200, and the first housing 110, such that efficiency and performance of the lithium air battery 1000 may be improved, and a lifespan thereof may be extended.

Here, a current collector 220 having a net shape may be provided on a lower side of the lithium metal 210 so that the lithium metal 210, the electrolyte part 400, and the first housing 110 accommodated into the space part 111 of the first housing 110 are closely adhered, wherein the current collector 220 has a flexible net shape, such that the lithium metal 210 and the electrolyte part 400 may contact each other so that the reaction is favorably performed That is, the current collector 220, the lithium metal 210, and the electrolyte part 400 accommodated into the space part 111 of the first housing 110 may be closely adhered to each other by the coupling of the second housing 120 to thereby significantly decrease the contact resistance. In addition, the current collector 220 may be made of copper, stainless, nickel, and the like.

Further, the electrolyte part 400 may further include a first sealing part 440 allowing the first electrode part 200 to be accommodated into the space part 111 so as to seal the space part 111.

The first sealing part 440 is interposed between edge parts of the electrolyte part 400, and then due to the coupling of the first housing 110 and the second housing 120, the first electrode part 200 is closed in the space part 111 by the electrolyte part 400 and the first sealing part 440. That is, since the water-based electrolyte, the non-water-based electrolyte, or the ionic liquid electrolyte 450 is not allowed to flow into the first electrode part 200, corrosion of the lithium metal 210 may be prevented, such that performance and a lifespan of the lithium air battery 1000 may be improved.

Here, as shown in the drawings, the first sealing part 440 such as O-ring may be formed at a lower side edge part of the solid electrolyte 420 and an upper side edge part of the accommodation body 430, of the electrolyte part 400, respectively, to thereby improve sealing strength for sealing the first electrode part 200 into the space part 111. In addition, the separator 410 containing an organic electrolyte may also be sealed by the solid electrolyte 420 and the first sealing part 440.

Further, the housing part 100 may further include a third housing 130 interposed between the first housing 110 and the second housing 120 and having a fixing hole 131 vertically penetrating through the third housing 130 so that the second electrode part 300 is fixed to the fixing hole 131.

That is, as shown in FIGS. 3 and 4, the third housing 130 is interposed between the first housing 110 and the second housing 120 and closely adhered thereto. Here, the first electrode part 200 and the electrolyte part 400 are accommodated into the space part 111 of the first housing 110 and the third housing 130 is coupled thereto from an upper side thereof, such that the electrolyte part 400, the first electrode part 200, and the bottom surface of the space part 111 of the first housing 110 may be coupled to each other so as to be closely adhered, and the first housing 110 and the third housing 130 may perform screw-connection between a second coupling part 133 formed of a bolt and the coupling hole 112 having female screw thread formed in the first housing 110. Here, a second fixing part 132 formed of the through-hole through which the second coupling part 133 penetrates may be formed in the third housing 130, wherein the second fixing part 132 has an inclined upper side, the second coupling part 133 is formed of a flat headed bolt, such that an upper side head part of the second coupling part 133 does not protrude upwardly than an upper surface of the third housing 130, whereby the second housing 120 may be easily closely adhered and coupled to the upper side of the third housing 130.

Then, the second housing 120 is closely adhered to the upper side of the third housing 130 and the through-hole 134 is formed in the third housing 130, such that the first coupling part 128 may penetrate through the first fixing part 127 and the through-hole 134 to perform screw-connection to the coupling hole 112 of the first housing 110.

Here, an edge of the second electrode part 300 is closely adhered and fixed between an upper side edge part of the fixing hole 131 formed in the third housing 130 and the second housing 120. In this case, as shown in the drawings, the upper side edge part of the fixing hole 131 may be inclined, and may have a step, such that the edge of the second electrode part 300 may be positioned at the step and fixed thereto. In addition, the water-based electrolyte, the non-water-based electrolyte, or the ionic liquid electrolyte 450 may be accommodated into the fixing hole 131, such that ions may be moved between the first electrode part 200 and the second electrode part 300.

Therefore, the first housing 110, the second housing 120, and the third housing 130 may be tightly coupled to each other to be closely adhered, adhesion strength of the first electrode part 200 and the electrolyte part 400 may be improved, and the second electrode part 300 may be easily coupled to the fixing hole and fixed thereto.

That is, the lithium air battery 1000 according to the exemplary embodiment of the present invention includes the housing part 100 having the first housing 110, the second housing 120, and the third housing 130, such that sealing property may be more excellent and durability may be improved as compared to the existing lithium air battery having an open upper portion and a large space part formed therein.

Further, the membrane 313 may be made of a porous membrane containing a sulfonic acid group, more preferably, may be made of a polyperfluorosulfonic acid (PFSA) (Product Name: Nafion) resin having a porous material. In addition, the membrane 313 may be closely adhered to the catalyst layer 312 by performing a heating process and a pressing process. Further, the membrane 313 may be formed by a dip-coating method using a PFSA; Nafion resin solution. The membrane 313 made of PFSA; Nafion has a proton (H+, hydrogen ion)-conductivity (conductivity: 0.1 S/cm), and consists of a hydrophilic sulfonyl group and hydrophobic fluorinated backbones in view of a molecular structure. Therefore, the membrane has a hydrophilic property and the proton-conductivity property to pass through Li+ ions and absorb water required for a reaction with oxygen and water, thereby making action of lithium-air smooth, which is appropriate for protection of a platinum (Pt) catalyst layer 312 according to an object of the present invention.

That is, the membrane 313 may be made of a material in which particles of the catalyst layer 312 are capable of being prevented from being separated, and lithium ions are movable, which is the most preferred in view of performance of the lithium air battery 1000.

In addition, the membrane 313 may be closely adhered to the catalyst layer 312 by performing a heating process and a pressing process. That is, the membrane 313 is heated and pressed by a high temperature on the catalyst layer 312, such that coupling strength between the catalyst layer 312 and the membrane 313 may be improved, thereby more definitely blocking separation of the particles of the catalyst layer 312 due to the repetition of the charging and discharging of the battery.

In addition, in the water-based electrolyte, the non-water-based electrolyte, or the ionic liquid electrolyte 450, the ionic liquid electrolyte may be used by dissolving lithium acetate dihydrate ($C_2H_3LiO_2$, Sigma-Aldrich), lithium chloride (LiCl, Sigma-Aldrich), lithium hydroxide (LiOH, Sigma-Aldrich) salts into D.I. water at a concentration of 1 mol. Otherwise, the water-based electrolyte may be selected from an ionic liquid, that is, a compound represented by the following Chemical Formula 1 and mixtures thereof:

$$X^+Y^- \quad \text{[Chemical Formula 1]}$$

in Chemical Formula 1 above, $X^+$ is a imidazolium ion, a pyrazolinium ion, a pyridinium ion, a pyrolidium ion, an ammonium ion, a phosphonium or a sulfonium ion; $Y^-$ is $(CF_3SO_2)_2N^-$, $(FSO_2)SN^-$, $BF_4^-$, $PF_6^-$, $AlCl_4^-$, $halogen^-$, $CH_3CO_2^-$, $CF_3CO_2^-$, $CH_3SO_4^-$, $CF_3SO_3^-$, $(CF_3SO_2)N^-$, $NO_3^-$, $SbF_6^-$, $MePhSO_3^-$, $(CF_3SO_2)_3C^-$ or $(R'')_2PO_2^-$(wherein R" is C1-C5 alkyl).

In Chemical Formula 1 above, cation (X+) may be exemplified by the following Table 1:

TABLE 1

| Cation (X+) | Structural Formula |
| --- | --- |
| Imidazolium Ion | (structure with $R^1$, $R^2$, $R^3$) |
| Pyridinium Ion | (structure with R, $R^6$) |
| Phosphonium Ion | (structure with $R^{11}$, $R^{12}$, $R^{13}$, $R^{14}$) |
| Pyrazolium Ion | (structure with $R^{18}$, $R^{19}$, $R^{20}$) |
| Pyrrolidium Ion | (structure with $R^4$, $R^5$) |
| Ammonium Ion | (structure with $R^7$, $R^8$, $R^9$, $R^{10}$) |
| Sulfonium Ion | (structure with $R^{15}$, $R^{16}$, $R^{17}$) |

In Table 1 above, $R^1$ to $R^{20}$ and R are each (C1-C20) alkyl, (C2-C20) alkenyl or (C2-C20) alkynyl, and wherein the alkyl, alkenyl and alkynyl may be further substituted with at least one selected from the group consisting of hydroxy, amino, —$SO_3H$, —COOH, (C1-C5)alkyl, (C1-C5)alkoxy, $Si(R^{21})(R^{22})(R^{23})$ ($R^{21}$, $R^{22}$ and $R^{23}$ are each independently hydrogen or (C1-C5)alkyl, (C1-C5)alkoxy).

In Chemical Formula 1 above, anion ($Y^-$) may be exemplified by the following Table 2:

TABLE 2

| Anion ($Y^-$) | Name of Anion | Anion ($Y^-$) | Name of Anion |
|---|---|---|---|
| $BF_4^-$ | tetrafluoroborate | $(CF_3SO_2)N^-$ | bis[(trifluoromethyl)sulfonyl]amide |
| $PF_6^-$ | hexafluorophosphate | $NO_3^-$ | nitrate |
| $AlCl_4^-$ | aluminium chloride | $SbF_6^-$ | hexafluoroanimonate |
| $X^-$ | Halogen⁻ | $(FSO_2)_2N^-$ | Bis[fluorosulfonyl]imide |
| $CH_3CO_2^-$ | acetate | $MePhSO_3^-$ | tosylate |
| $CF_3CO_2^-$ | trifluoroacetate | $(CF_3SO_2N^-$ | bis(trifluoromethylsulfonyl)imide |
| $CH_3SO_4^-$ | methylsulfate | $(CF_3SO_2)_3C^-$ | tris(trifluoromethylsulfonyl)methide |
| $CF_3SO_3^-$ | trifluoromethylsulfate | $(OR)_2PO_2^-$ | dialkyl phosphate |

Examples of the water-based electrolyte may include 1-methyl-3-ethyl imidazolium bis(trifluoromethanesulfonyl)imide, 1-methyl-3-propyl imidazoliumbis(trifluoromethanesulfonyl)imide, 1-methyl-3-allyl imidazoliumbis(trifluoromethanesulfonyl)imide, 1-methyl-3-ethyl imidazoliumbis(fluorosulfonyl)imide, 1-methyl-3-propyl imidazoliumbis(fluorosulfonyl)imide, 1-methyl-3-allyl imidazoliumbis(fluorosulfonyl)imide, 1-methyl-1-propyl pyrolidium bis(trifluoromethanesulfonyl)imide, 1-methyl-1-allyl pyrolidium bis(trifluoromethanesulfonyl)imide, 1-methyl-1-propyl pyrolidium (fluorosulfonyl)imide, 1-methyl-1-allyl pyrolidium (fluorosulfonyl)imide, 1-butyl-3-methylimidazoliumchloride, 1-butyl-3-methylimidazolium dibutylphosphate, 1-butyl-3-methylimidazolium dicyanamide, 1-butyl-3-methylimidazolium hexafluoroantimonate, 1-butyl-3-methylimidazolium hexafluorophosphate, 1-butyl-3-methylimidazolium hydrogencarbonate, 1-butyl-3-methylimidazolium hydrogensulfate, 1-butyl-3-methylimidazolium methylsulfate, 1-butyl-3-methylimidazolium tetrachloroaluminate, 1-butyl-3-methylimidazolium tetrachloroborate, 1-butyl-3-methylimidazolium thiocyanate, 1-dodecyl-3-methylimidazolium iodide, 1-ethyl-2,3-dimethylimidazolium chloride, 1-ethyl-3-methylimidazolium bromide, 1-ethyl-3-methylimidazolium chloride, 1-ethyl-3-methylimidazolium hexafluorophosphate, 1-ethyl-3-methylimidazolium tetrafluoroborate, 1-hexyl-3-methylimidazolium tetrafluoroborate, 1-butyl-4-methylpyridium chloride, 1-butyl-4-methylpyridium tetrafluoroborate, 1-butyl-4-methylpyridium hexafluorophosphate, benzyldimethyltetradecylammonium chloride, tetraheptylammonium chloride, tetrakis(decyl)ammonium bromide, tributylmethylammonium chloride, tetrahexylammonium iodide, tetrabutylphosphonium chloride, tetrabutylphosphonium tetrafluoroborate, triisobutylmethylphosphonium tosylate 1-butyl-1-methylpyrrolidinium, 1-butyl-1-methylpyrolidium bromide,1-butyl-1-methylpyrrolidium tetrafluoroborate, 1-aryl-3-methylimidazolium bromide, 1-aryl-3-methylimidazolium chloride , 1-benzyl-3-methylimidazolium hexafluorophosphate, 1-benzyl-3-methylimidazolium bis(trifluoromethylsulfonyl)imide, 1-butyl-3-methylimidazolium dibutyl phosphate, 1-(3-cyanopropyl)-3-methylimidazolium bis(trifluoromethylsulfonyl)amide, 1,3-dimethylimidazolium dimethyl phosphate, 1-ethyl-2,3-dimethylimidazolium ethyl sulfate, and the like, and preferably, 1-ethyl-3-methylimidazolium aluminum chloride, 1-butyl-4-methylpyridium hexafluorophosphate, benzyldimethyltetradecylaluminum chloride, tributylmethylaluminum chloride, tetrabutylphosphinium tetrafluoroborate, 1-butyl-1-methylpyrrolidium chloride, 1-butyl-3-methylimidazolium tetrachloroaluminate, 1-butyl-4-methylpyridium chloride, 1-butyl-4-methylpyridium tetrafluoroborate, and the like.

The water-based electrolyte may preferably include a cation represented by the following Chemical Formula 2 or 3 in order to have high ion conductivity and viscosity showing excellent electric properties:

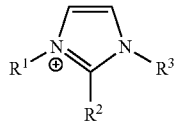

[Chemical Formula 2]

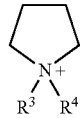

[Chemical Formula 3]

in Chemical Formula 2 or 3, $R^1$ to $R^4$ are each (C1-C20) alkyl, (C2-C20) alkenyl or (C2-C20) alkynyl, and wherein the alkyl, alkenyl and alkynyl may be further substituted with at least one selected from the group consisting of hydroxy, amino, —$SO_3H$, —COOH, (C1-C5)alkyl, (C1-C5)alkoxy, Si(R21) (R22) (R23) (R21, R22 and R23 are each independently hydrogen or (C1-C5) alkyl, (C1-C5)alkoxy).

More preferably, the water-based electrolyte may include at least one compound selected from the following structures:

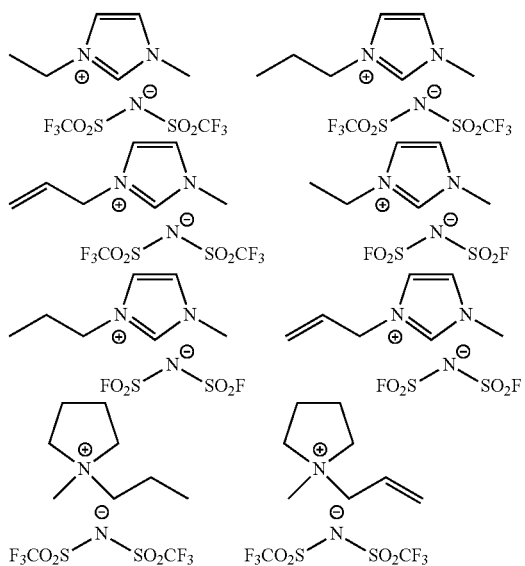

-continued

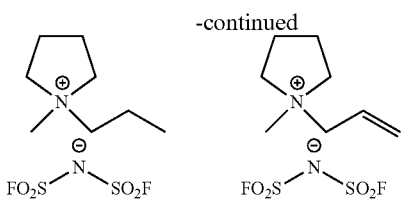

The water-based electrolyte may contain at least one lithium salt selected from the group consisting of LiPF$_6$, LiTFSI(lithium bis(fluorosulfonly)imide), LiBF$_4$, LiClO$_4$, LiSbF$_6$, LiAsF$_6$, LiN (SO$_2$C$_2$F$_5$)$_2$, LiN (CF$_3$SO$_2$)$_2$, LiN (SO$_3$C$_2$F$_5$)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$)(C$_y$F$_{2y+1}$SO$_2$)(wherein, x and y are each natural number), LiCl, LiI and LiB(C$_2$O$_4$)$_2$, wherein the lithium salt may be contained in a concentration of 0.025 to 1 mol in order for produced Li$_2$O$_2$ to increase an ion conductivity without hindering a continuous reaction on a surface of porous air-cathode.

In addition, in the water-based electrolyte, the non-water-based electrolyte, or the ionic liquid electrolyte 450, an organic solvent without containing water may be used as the non-water-based electrolyte. As the non-water-based organic solvent, a carbonate-based solvent, an ester-based solvent, an ether-based solvent, a ketone-based solvent, an organosulfur-based solvent, an organophosphorous-based solvent or an aprotic solvent may be used.

As the carbonate-based solvent, dimethyl carbonate (DMC), diethyl carbonate (DEC), ethyl methyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), fluoroethylene carbonate (FEC), butylene carbonate (BC) and the like, may be used. As the ester-based solvent, methyl acetate, ethyl acetate, n-propyl acetate, dimethyl acetate, methyl propionate, ethyl propionate, γ-buyrolactone, decanolide, valerolactone, mevalonolactone, caprolactone, and the like, may be used.

As the ether-based solvent, dibutyl ether, tetraglyme, diglyme, dimethoxyethane, 2-methyltetrahydrofuran, tetrahydrofuran, and the like, may be used. As the ketone-based solvent, cyclohexanone, and the like, may be used.

In addition, as the organosulfur-based solvent and the organophosphorous-based solvent, methanesulfonyl chloride and p-trichloro-n dichlorophosphoryimonophosphazene, and the like, may be used. As the aprotic solvent, nitriles such as R'CN (R' is C2 to C20 hydrocarbon group having straight chain, branched, or cyclic structure and may include a double bond ring or an ether bond), and the like, amides such as dimethylformamide, and the like, dioxolanes such as 1,3-dioxolane, and the like, sulfolanes, and the like, may be used.

The non-water-based organic solvent may be used alone or two or more thereof may be mixed, and a mixing ratio in the mixture of two or more thereof may be appropriately adjusted according to desired performance of the battery, which may be appreciated by a person skilled in the art.

Here, the non-water-based organic solvent may contain a lithium salt, wherein the lithium salt may be dissolved into the organic solvent to function as a source of the lithium ion in the battery.

As the lithium salt, one or two or more selected from the group consisting of LiPF$_6$, LiTFSI(lithium bis(fluorosulfonly)imide), LiBF$_4$, LiSbF$_6$, LiAsF$_6$, LiN(SO$_2$C$_2$F$_5$)$_2$, Li (CF$_3$SO$_2$)$_2$N, LiC$_4$F$_9$SO$_3$, LiClO$_4$, LiAlO$_2$, LiAlCl$_4$, LiN (C$_x$F$_{2x+1}$SO$_2$) (C$_y$F$_{2y+1}$SO$_2$) (wherein, x and y are each natural number), LiF, LiBr, LiCl, LiI and LiB(C$_2$O$_4$)$_2$ (lithium bis(oxalato) borate; LiBOB) may be used like the water-based electrolyte.

The lithium salt may have a concentration of 0.1 to 2.0 mol. In the case in which the lithium salt has the above-described range of concentration, the electrolyte has an appropriate conductivity and viscosity, such that excellent electrolyte performance may be shown, and the lithium ions may be effectively moved. The non-water-based organic solvent may further contain other metal salts such as AlCl$_3$, MgCl$_2$, NaCl, KCl, NaBr, KBr, CaCl$_2$, and the like, in addition to the lithium salt.

In addition, an organic electrolyte contained in the separator 410 may be a non-water-based electrolyte. Specifically, as the organic electrolyte contained in the separator 410, an organic solvent without containing water may be used like the above-described non-water-based electrolyte in the electrolyte 450. As the non-water-based organic solvent, a carbonate-based solvent, an ester-based solvent, an ether-based solvent, a ketone-based solvent, an organosulfur-based solvent, an organophosphorous-based solvent or an aprotic solvent may be used.

As the carbonate-based solvent, dimethyl carbonate (DMC), diethyl carbonate (DEC), ethyl methyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), fluoroethylene carbonate (FEC), butylene carbonate (BC) and the like, may be used, and as the ester-based solvent, meti acetate, ethyl acetate, n-propyl acetate, dimethyl acetate, methyl propionate, ethyl propionate, y-butyrolactone, decanolide, valerolactone, mevalonolactone, caprolactone, and the like, may be used.

As the ether-based solvent, dibutyl ether, tetraglyme, diglyme, dimethoxyethane, 2-methyltetrahydrofuran, tetrahydrofuran, and the like, may be used, and as the ketone-based solvent, cyclohexanone, and the like, may be used.

In addition, as the organosulfur-based solvent and the organophosphorous-based solvent, methanesulfonyl chloride and p-trichloro-n-dichlorophosphorylmonophosphazene, and the like, may be used, and as the aprotic solvent, nitriles such as R'CN (R' is C2 to C20 hydrocarbon group having straight chain, branched, or cyclic structure and may include a double bond ring or an ether bond), and the like, amides such as dimethylformamide, and the like, dioxolanes such as 1,3-dioxolane, and the like, sulfolanes, and the like, may be used.

The non-water-based organic solvent may be used alone or two or more thereof may be mixed, and a mixing ratio in the mixture of two or more thereof may be appropriately adjusted according to desired performance of the battery, which may be appreciated by a person skilled in the art.

Here, the non-water-based organic solvent may contain a lithium salt, wherein the lithium salt may be dissolved into the organic solvent to function as a source of the lithium ion in the battery, and for example, the lithium salt serves to promote movement of the lithium ions between the anode and the lithium ion conductive solid electrolyte 420.

The lithium salt may be the same as or may be different from the lithium salt contained in the above-described water-based electrolyte, the non-water-based electrolyte, or the ionic liquid electrolyte 450, and one or two or more selected from the group consisting of LiPF$_6$, LiTFSI(lithium bis(fluorosulfonly)imide), LiBF$_4$, LiSbF$_6$, LiAsF$_6$, LiN (SO$_2$C$_2$F$_5$)$_2$, Li (CF$_3$SO$_2$)$_2$N, LiC$_4$F$_9$SO$_3$, LiClO$_4$, LiAlO$_2$, LiAlCl$_4$, LiN(C$_x$F$_{2x+1}$SO$_2$) (C$_y$F$_{2y+1}$SO$_2$) (wherein, x and y are each natural number), LiF, LiBr, LiCl, LiI and LiB $(C_2O_4)_2$(lithium bis(oxalato) borate; LiBOB) may be used as the lithium salt.

The lithium salt may have a concentration of 0.1 to 2.0 mol. In the case in which the lithium salt has the above-described range of concentration, the electrolyte has an appropriate conductivity and viscosity, such that excellent electrolyte performance may be shown, and the lithium ions may be effectively moved. The non-water-based organic solvent may further contain other metal salts such as $AlCl_3$, $MgCl_2$, NaCl, KCl, NaBr, KBr, $CaCl_2$, and the like, in addition to the lithium salt.

The solid electrolyte 420 may indicate a lithium ion conductive solid electrolyte film and may function as a protective film so that when the water-based electrolyte, the non-water-based electrolyte, or the ionic liquid electrolyte 450 is the water-based electrolyte, water contained in the water-based electrolyte does not directly react with lithium contained in the anode.

Examples of the lithium ion conductive solid electrolyte 420 may include a lithium ion conductive glass, a lithium ion conductive crystal (ceramic or glass-ceramic) or an inorganic material containing a mixture thereof, and the like, and the lithium ion conductive solid electrolyte 420 may be practiced as a proton conductive ion-exchange resin, a proton conductive ion-exchange film, and the like. More specifically, it is preferred that the solid electrolyte 420 of the present invention is practiced as a Nafion film, such that it is easy to manufacture a lithium air battery, and the battery has a high charge and discharge energy efficiency.

Hereinafter, the present invention will be more appreciated by the following drawings and Examples, which are given by way of illustration but are not intended to limit the protective scope defined by the attached claims of the present invention.

PREPARATION EXAMPLE 1

Preparation of Nafion Coated Cathode

The membrane 313 of the lithium air battery according to the present invention may be coupled to one side of the catalyst layer 312 to prevent particles of the catalyst layer 312 from being detached, wherein the membrane may be a Nafion membrane.

Hot Press Process Using Nafion Membrane

Nafion perfluorinated membrane (N-115 or N-117, Sigma-Aldrich) was cut by a punch so as to be slightly larger than a diameter of cathode used in the manufacture of the battery (for example, in a case of cathode having a diameter of 1.5 cm, Nafion perfluorinated membrane has a diameter of 1.7cm). The previously prepared phosphorus carbon buffer layer impregnated with a Nafion solution was sequentially stacked on a surface of the platinum (Pt) catalyst layer of the cathode while contacting the Nafion membrane, and then put into a release film bag. The prepared release film bag was maintained under a pressure of 100 kg/cm$^2$ for 3 minutes by a hot press process. Here, the hot press process was maintained at a temperature of 135° C. Here, in order to induce change in microstructure of the cathode, pressure, temperature, and retention time may be changed.

Dip Coating Process Using Nafion Resin Solution

A Nafion perfulorinated resin and an aqueous dispersion (10 wt % in H$_2$O, Sigma-Aldrich) each having an appropriate amount (100 mL in a case of cathode having a diameter of 1.5 cm) according to a size of the cathode, were put into a Petri dish, and then, maintained for 5 to 10 minutes in a state in which the platinum (Pt) layer of the cathode having the phosphorus carbon buffer layer impregnated with the Nafion solution previously formed on the surface thereof was completely immersed thereinto. Next, the reaction mixture was dried under laminar flow in a fume hood at room temperature for 24 hours. As the Nafion resin used in the present Preparation Example 1, a Nafion resin solution having a high concentration (for example, 30 wt % in H$_2$O) may be used, and the dipping and drying processes may be repeated 1 to 2 times or a plurality of times according to thickness of the Nafion film and microstructure which is desired to be finally prepared in the platinum catalyst layer of the cathode.

PREPARATION EXAMPLE 2

Preparation of Buffer Layer Between Catalyst Layer and Membrane

The buffer layer 315 consisting of the conductive ion-exchange resin and the mesoporous carbon is adopted between the electrolyte and the catalyst layer 312 configuring the cathode, to prevent the contact between the catalyst layer 312 and the large amount of electrolyte in the lithium air battery 1000, thereby reducing occurrence of overvoltage at the time of charging and discharging the battery.

Preparation Method 1

In order to prepare a buffer layer, a Nafion film was made to have a circular shape by a punch having a diameter of 16 cm. Two or three drops of 20 wt % (in H$_2$O) or 10 wt % (in H$_2$O) of a Nafion resin solution were dropped onto a Nafion film using pipettes to wet the surface thereof, and a carbon foam having a thickness of 2 mm and a diameter of 16 cm was placed onto the surface thereof. Here, since the shape of the Nafion film was changed, 200 g of a weight was placed onto the Nafion film until being dried so that the shape thereof was maintained. After being dried in the air for 24 hours, the weight was removed, two or three drops of 20 wt % (in H2O) or 10 wt % (in H2O) of the Nafion resin solution were dropped onto the carbon foam using pipettes to entirely wet the carbon foam. Provided that, the Nafion resin solution should not be excessively wet so as not to flow out around the Nafion film.

PREPARATION EXAMPLE 3

Preparation of Polyolefin-based Composite Microporous Film (or Separator)

The polyolefin-based composite microporous film (or separator) used to suppress evaporation of the electrolyte in the lithium air battery is a porous film containing a polymer binder and an inorganic particle, wherein as the polymer binder, water-soluble polymer and non-soluble polymer are simultaneously used, and the contents thereof are adjusted to enable optimization of heat resistance, adhesive strength, and moisture content.

Preparation Method 1

In order to prepare the polyolefin-based microporous film, high density polyethylene having a weight average molecular weight of $3.8 \times 10^5$ was used. As a diluent, dibutyl phthalate and paraffin oil having a 40 kinematic viscosity of 160 cSt were mixed at 1:2 ratio to be used, wherein the contents of polyethylene and the diluent were 30 wt %, and 70 wt %, respectively. The composition was pressed out at 240° C. using a biaxial compound having T-die mounted thereon and passed through a section set at 170° C., thereby inducing phase-separation of polyethylene and diluent present in a single phase, and then, a sheet was prepared using casting roll. The sheet prepared using a successive biaxial stretching machine was stretched at a stretching temperature of 128° C. by six times, in a longitudinal direction and a transverse direction, respectively, and after being stretched, a heat setting temperature was 128° C., and a heat setting width was 1-1.2-1.1. A final thickness of the prepared polyethylene-based microporous film was 16 μm, gas permeability (Gurley) was 130 sec, and a void closing temperature was 140° C.

The polyolefin-based microporous film prepared by the above-described method was used, 2.6 wt % of polyvinylalcohol having a melting temperature of 220° C. and a saponification degree of 98%, an acrylic latex having Tg of −45° C. in a solid content of 3.1 wt% (Rovene 6050) were used, and 47 wt % of $AlO_3$(an average particle size of 0.4 μm) powder was dissolved into deionized water. The thus-prepared reactant was applied onto a cross-section of the polyolefin-based microporous film using a die coating scheme, a solvent was removed and dried by applying a predetermined air volume in an oven at 60° C., thereby finally preparing the polyolefin-based composite microporous film including a coating layer having a thickness of 4.2 μm.

Preparation Method 2

In order to prepare a polyolefin-based microporous film, high density polyethylene having a weight average molecular weight of $3.8 \times 10^5$ was used, and as diluent, dibutyl phthalate and paraffin oil having a 40 kinematic viscosity of 160 cSt were mixed at 1:2 ratio to be used, wherein the contents of polyethylene and the diluent were 25 wt %, and 75 wt %, respectively. The composition was pressed out at 240° C. using a biaxial compound having T-die mounted thereon and passed through a section set at 170° C., thereby inducing phase-separation of polyethylene and diluent present in a single phase, and then, a sheet was prepared using casting roll. The sheet prepared using a successive biaxial stretching machine was stretched at a stretching temperature of 128° C. by seven times, in a longitudinal direction and a transverse direction, respectively, and after being stretched, a heat setting temperature was 126° C., and a heat setting width was 1-1.2-1.2. A final thickness of the prepared polyethylene-based microporous film was 9 μm, gas permeability (Gurley) was 110 sec, and a void closing temperature was 139° C.

The polyolefin-based microporous film as described above, 0.5 wt % of Silanol-polyvinylalcohol copolymer having a melting temperature of 225° C. and a saponification degree of 97.5% and 1.5 wt % of carboxylated Stylene butadiene Latex (Rovene 4305) having Tg of −24° C. were used, and 22 wt % of plate-shaped Al2O3 (average particle size of 1.5 μm) powder having an aspect ratio of 10 to 20 was dissolved into deinoized water to be prepared. The thus-prepared reaction mixture was applied onto a cross-section of the polyolefin-based microporous film using a microgravure coating scheme, a solvent was removed and dried by applying a predetermined air volume in an oven at 60° C., thereby finally preparing the polyolefin-based composite microporous film including a coating layer having a thickness of 3.5 μm.

Preparation Method 3

The polyolefin-based microporous film prepared by the above-described Preparation Method 1 was used, 0.6 wt % of polyvinylalcohol having a melting temperature of 220° C. and a saponification degree of 99% and an acrylic latex having Tg of −45° C. were dissolved into 4.0 wt % of Rovene 6050, and 40 wt % of alumina powder ($Al_2O_3$; an average particle size of 0.6 μm) was dissolved into deionized water. The thus-prepared reaction mixture was applied onto a cross-section of the polyolefin-based microporous film using a die coating scheme, a solvent was removed and dried by applying a predetermined air volume in an oven at 60° C., thereby finally preparing the polyolefin-based composite microporous film including a coating layer having a thickness of 2.5 μm.

EXAMPLE 1

Manufacture of Lithium Air Battery 16.3 g of LiCH3COOH (lithium acetic acid, molar mass=102.02 g/mol, Sigma-Aldrich), 6.8 g of LiCl (lithium chloride, molar mass=42.39 g/mol, Sigma-Aldrich), and 3.8 g of LiOH (lithium hydroxide, molar mass=23.95 g/mol, Sigma-Aldrich) as the lithium salt were dissolved into 1 liter (L) of D.I. water, thereby preparing each water-based electrolyte having a concentration of 1M, as a second electrolyte. A lithium metal thin film was used as an anode, and polypropylene (SKI, F305CHP, 525HV) was used as a separator disposed on the lithium metal thin film. As a porous air-cathode, a Nafion coated air-cathode was prepared according to Preparation Example 1 above. As a basic air-cathode, a gas diffusion layer having a platinum catalyst layer (Pt 10 wt %, Fuel Earth, EP1019) was used. The buffer layer between the catalyst layer and the membrane is manufactured according to Preparation Example 2 above, wherein the phosphorus carbon is used by being impregnated with 20 wt % of Nafion solution. In addition, the polyolefin-based composite microporous film (SKI, F305CHP, 525HV) used in order to suppress evaporation of the electrolyte was prepared by Preparation Example 3 above.

The anode, which is the lithium metal thin film, was installed in a stainless case, and a separator prepared by injecting one of 1M of organic-based electrolytes (LiTFSi in EC:DMC=1:1, 1M of LiTFSi in EC:PC=1:1, 1M of LiPF6 in EC:DEC=1:1) thereto was installed at a side facing the anode, and a solid electrolyte film (OHARA, AG-01) was mounted thereon, and the accommodation body into which the prepared water-based electrolyte was injected was installed on the solid electrolyte film, such that the anode and the cathode faced each other. Then, a carbon paper washer was disposed on the cathode, and the second housing 120 was pressed out to fix the cell, thereby manufacturing a lithium air battery. 1M $LiCH_3COOH$ in D.I water was used as the water-based electrolyte, 1M LiTFSi in EC:DMC=1:1 having good wettability with the separator was used as the organic-based electrolyte, and other materials were used as the same as described above.

A charge and discharge cycle, a discharge energy, a charge energy, and a charge and discharge energy efficiency of the lithium air battery according to Example 1 manufactured by the above-described method were shown in FIGS. 5 to 8. Here, the experiment was practiced by discharging and charging the battery in a constant current mode of 0.25 $mA/cm^2$ under a temperature of 25° C., a pressure of 1 atm, for a predetermined time, which is 24 minutes. Here, it could be appreciated from the drawings that the lithium air battery according to Example is significantly stable and has excellent battery performance, and good cycle lifespan.

COMPARATIVE EXAMPLE 1

Manufacture of Lithium Air Battery

A lithium air battery according to Comparative Example 1 was manufactured by the same method as Example 1 above, except for the configuration of the buffer layer.

A charge and discharge cycle, a discharge energy, a charge energy, and a charge and discharge energy efficiency of the lithium air battery according to Comparative Example 1 manufactured by the above-described method were shown in FIGS. 9 to 12. Here, the experiment was practiced by discharging and charging the battery in a constant current mode of 0.25 mA/cm$^2$ under a temperature of 25° C., a pressure of 1 atm, for a predetermined time, which is 24 minutes.

Accordingly, it could be appreciated that the lithium ion battery according to Example 1 had a longer charge and discharge cycle and more improved charge and discharge energy efficiency as compared to the lithium ion battery according to Comparative Example 1.

Specifically, it could be appreciated in the lithium air battery of the present invention that the Nafion-coated membrane 313 prevents the platinum (Pt) catalyst layer from being slowly delaminated, and the buffer layer 315 prevents the electrolyte from being excessively contacted to the catalyst layer 312, and the polyolefin-based microporous film prevents evaporation of the water-based electrolyte solvent, thereby having significantly improved performance of the battery, as shown in Example 1 above. Accordingly, it could be appreciated that an excellent cycle lifespan of 246 cycles under an atmospheric condition was secured, and a discharge energy retention rate was also significantly high.

In addition, when the lithium metal is used as the anode, in the existing lithium air battery, it is difficult to secure the lifespan over several tens of cycles due to an effect of moisture. However, the lithium air battery according to the present invention may prevent an electric short circuit due to a structure thereof and basically obstruct infiltration of moisture, thereby securing excellent cycle lifespan.

Further, when using an ionic liquid as the electrolyte in the lithium air battery according to the present invention, in particular, using the ionic liquid having anions such as FSI or TFSI as the water-based electrolyte, deterioration due to decomposition reaction with lithium may be reduced, such that excellent charge and discharge properties may be provided. Here, even in a case of a general half-cell, at least 4 to 12 hours stabilization time is required, meanwhile, the lithium air battery according to the present invention may have a short stabilization time of 30 minutes to 1 hour.

The lithium air battery of the present invention may include the buffer layer 315 consisting of the conductive ion-exchange resin and the mesoporous carbon formed between the electrolyte and the catalyst layer 312 configuring the cathode to prevent the contact between the catalyst layer and a large amount of electrolyte in the lithium air battery, thereby reducing occurrence of overvoltage at the time of charging and discharging the battery.

At the same time, with the lithium air battery according to the present invention, the cathode contacting the electrolyte and using oxygen in the air as an active material is coupled to the hydrophobic polyolefin-based microporous film and the membrane through which the lithium ions pass, such that even though the charging and discharging of the battery is repeated, the catalyst layer may not be detached, but the water-based electrolyte solvent may be prevented from being evaporated, thereby improving durability.

Further, the lithium air battery having the above-described advantageous effects according to the present invention may prevent deterioration in performance of the battery and extend a lifespan.

Hereinabove, although the present invention is described by specific matters, limited exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirits of the invention.

What is claimed is:

1. A lithium air battery comprising:
   an anode including a lithium metal;
   a cathode including a gas diffusion layer of which one side contacts an air, a catalyst layer formed on the other side of the gas diffusion layer, a membrane coupled to the catalyst layer so that lithium ions pass therethrough, and a buffer layer containing a conductive ion-exchange resin and a mesoporous carbon and provided between the membrane and the catalyst layer, and spaced apart from the anode; and
   an electrolyte part provided between the anode and the cathode.

2. The lithium air battery of claim 1, wherein the buffer layer contains the mesoporous carbon impregnated with a conductive ion-exchange resin solution.

3. The lithium air battery of claim 2, wherein the conductive ion-exchange resin solution contains at least 20 wt % (in H$_2$O) of a conductive ion-exchange resin.

4. The lithium air battery of claim 3, wherein the conductive ion-exchange resin comprises polyperfluorosulfonic acid.

5. The lithium air battery of claim 1, wherein the electrolyte part includes a separator closely adhered on one side of the anode and containing an organic-based electrolyte, a solid electrolyte closely adhered on one side of the separator, and a water-based electrolyte, a non-water-based electrolyte, or an ionic liquid electrolyte provided between the solid electrolyte and the cathode.

6. The lithium air battery of claim 5, wherein the solid electrolyte is a proton conductive ion-exchange resin or a proton conductive ion-exchange film.

7. The lithium air battery of claim 1, wherein the cathode further includes a polyolefin-based microporous film coupled on one side of the gas diffusion layer.

8. The lithium air battery of claim 1, further comprising:
   a housing part including a first housing provided with a space part having an open upper side, and a second housing disposed at an upper portion of the first housing to seal the space part of the first housing, and having an air accommodation part having an open lower side, and ventilation holes formed therein to communicate with the air accommodation part,
   wherein the anode is accommodated into the space part of the first housing,
   the cathode is coupled to the lower side of the air accommodation part of the second housing to be spaced apart from the anode and has the gas diffusion layer disposed on an upper side thereof and the membrane disposed on a lower side thereof, and
   the electrolyte part is provided in the space part of the first housing to be provided between the anode and the cathode.

9. The lithium air battery of claim 8, wherein the electrolyte part includes a separator closely adhered on an upper side of the anode and containing an organic-based electrolyte, a solid electrolyte closely adhered on an upper side of the separator, a water-based electrolyte, a non-water-based electrolyte, or an ionic liquid electrolyte provided between the solid electrolyte and the cathode, and an accommodation body provided on an upper side of the solid electrolyte and having an accommodation hole vertically penetrating therethrough, and the accommodation body is disposed so that the solid electrolyte, the separator, and the anode are closely adhered to the space part.

10. The lithium air battery of claim 8, wherein the housing part further includes a third housing interposed between the first housing and the second housing and having a fixing hole vertically penetrating therethrough so that the cathode is fixed to the fixing hole.

11. The lithium air battery of claim 8, wherein the membrane is a porous membrane containing a sulfonic acid group.

12. The lithium air battery of claim 11, wherein the membrane is made of a polyperfluorosulfonic acid (PFSA) resin having a porous material.

13. The lithium air battery of claim 12, wherein the membrane is closely adhered to the catalyst layer by heating and pressing the PFSA resin or by a dip-coating method using a PFSA resin solution.

14. The lithium air battery of claim 1, wherein the membrane is a porous membrane containing a sulfonic acid group.

15. The lithium air battery of claim 14, wherein the membrane is made of a polyperfluorosulfonic acid (PFSA) resin having a porous material.

16. The lithium air battery of claim 15, wherein the membrane is closely adhered to the catalyst layer by heating and pressing the PFSA resin or by a dip-coating method using a PFSA resin solution.

* * * * *